United States Patent

Suzuoka et al.

[11] Patent Number: 5,933,832
[45] Date of Patent: Aug. 3, 1999

[54] RETRIEVAL SYSTEM FOR FREQUENTLY UPDATED DATA DISTRIBUTED ON NETWORK

[75] Inventors: Takashi Suzuoka; Shin-ichi Kanno, both of Kawasaki; Nobuyuki Sawashima; Tetsuya Yamane, both of Tokyo, all of Japan

[73] Assignee: Kabushiki Kaisha Toshiba, Kawasaki, Japan

[21] Appl. No.: 08/927,031

[22] Filed: Sep. 10, 1997

[51] Int. Cl.[6] ....................................................... G06F 17/30

[52] U.S. Cl. .................................. 707/101; 707/10; 707/5; 455/4; 455/5; 395/187; 395/200

[58] Field of Search .................................. 707/10, 2, 3, 5, 707/101, 102, 7, 103, 104; 345/327; 348/1, 7, 10, 12, 13; 455/2, 4, 5; 341/76, 77; 395/200, 187; 705/26, 44

[56] References Cited

U.S. PATENT DOCUMENTS

| | | | |
|---|---|---|---|
| 5,727,156 | 3/1998 | Herr-Hoyman et al. | 395/200 |
| 5,765,150 | 6/1998 | Burrows | 707/5 |
| 5,797,008 | 8/1998 | Burrows | 707/101 |
| 5,812,930 | 9/1998 | Zavrel | 455/5 |
| 5,835,087 | 11/1998 | Herz et al. | 345/327 |
| 5,855,020 | 12/1998 | Kirsch | 707/10 |

*Primary Examiner*—Wayne Amsbury
*Assistant Examiner*—Thu-Thao Havan
*Attorney, Agent, or Firm*—Banner & Witcoff, Ltd.

[57] ABSTRACT

A retrieval system for performing database retrieval in response to a retrieval request includes a database preparing means for collecting corresponding data to prepare a database under at least a condition that an update frequency range of data serving as a target for index table generation is uniquely assigned to the database, and an update frequency of data falls within the assigned update frequency range, or a mean update frequency of a data group to which the data belongs falls within the assigned update frequency range.

21 Claims, 8 Drawing Sheets

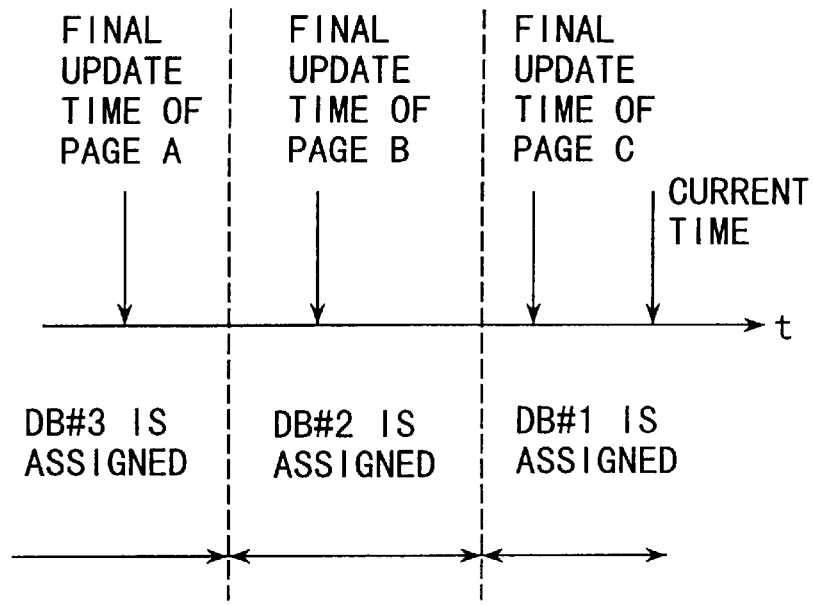
F I G. 1
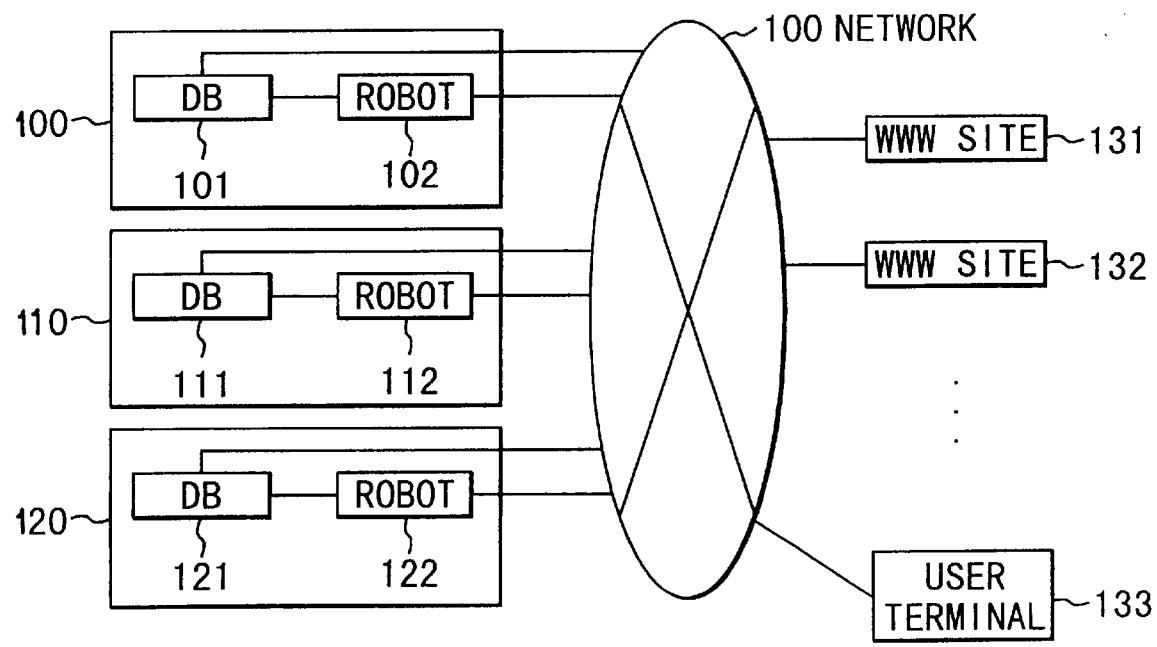
F I G. 2

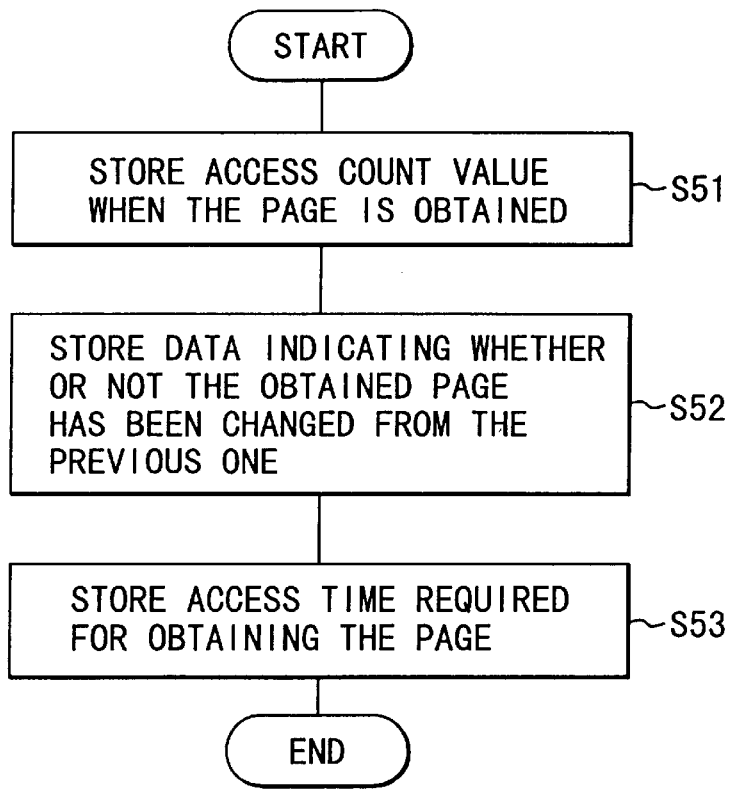
F I G. 4
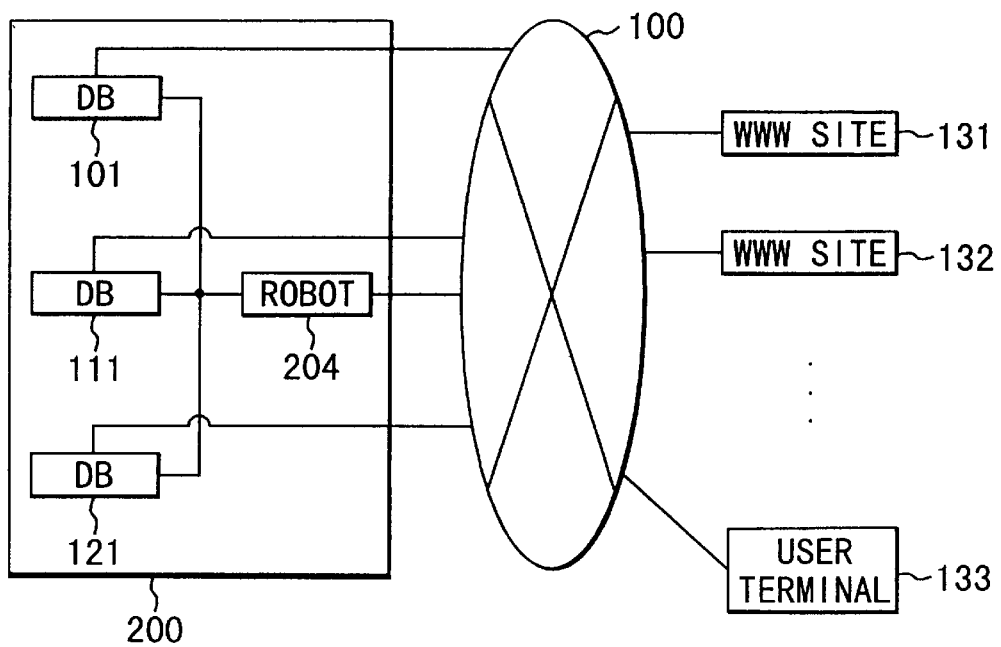
F I G. 5

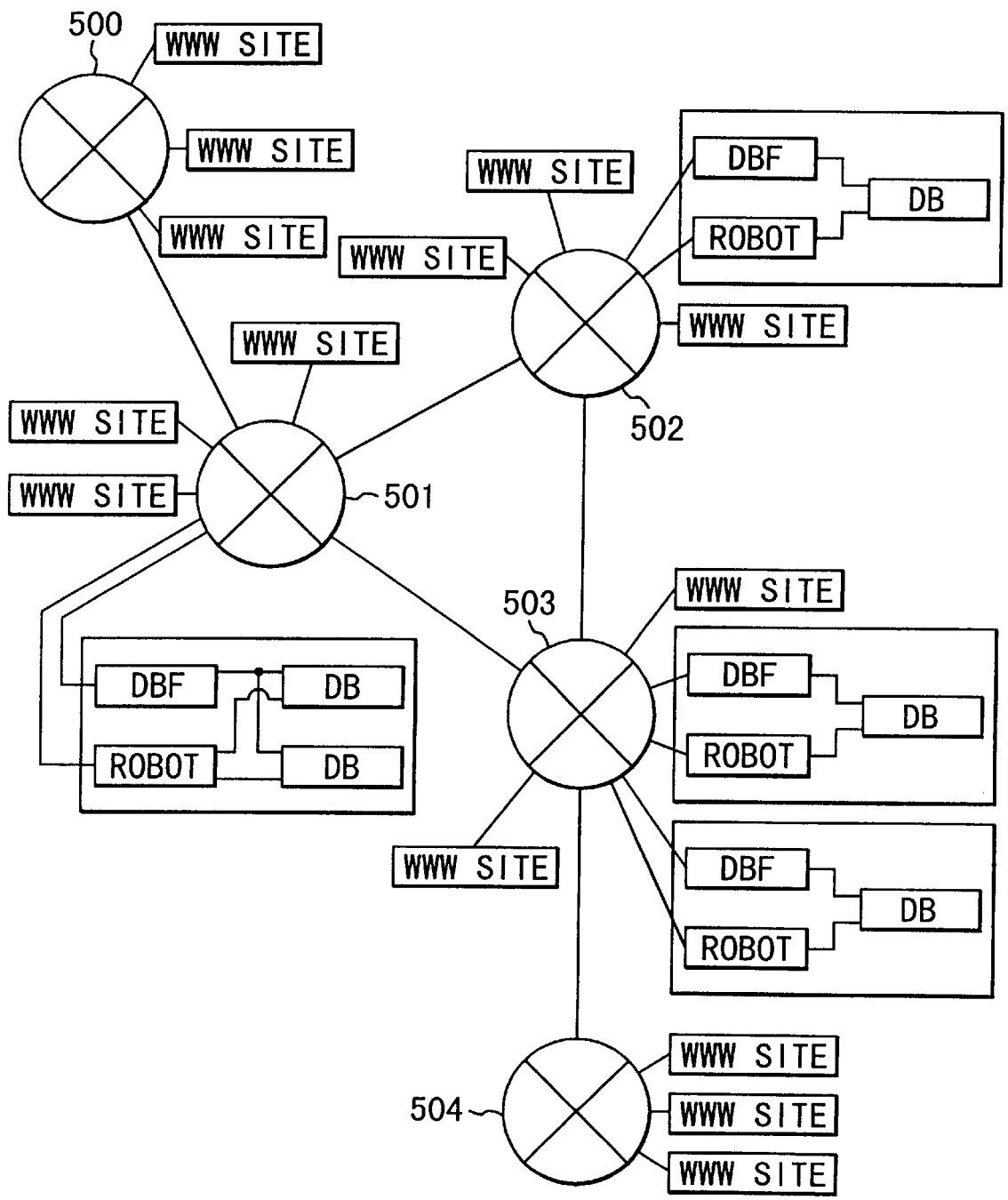
F I G. 10

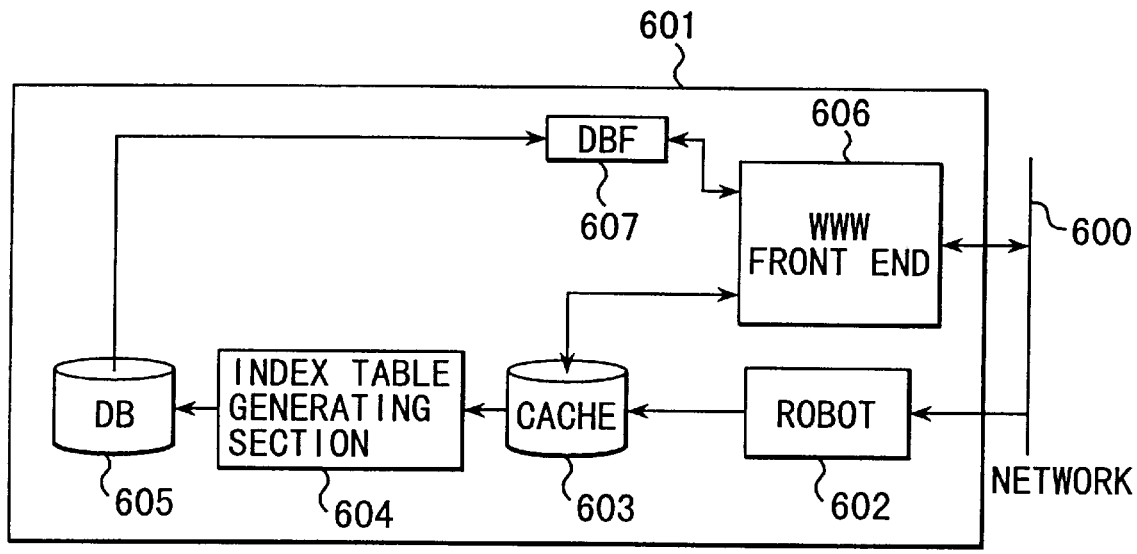
F I G. 11
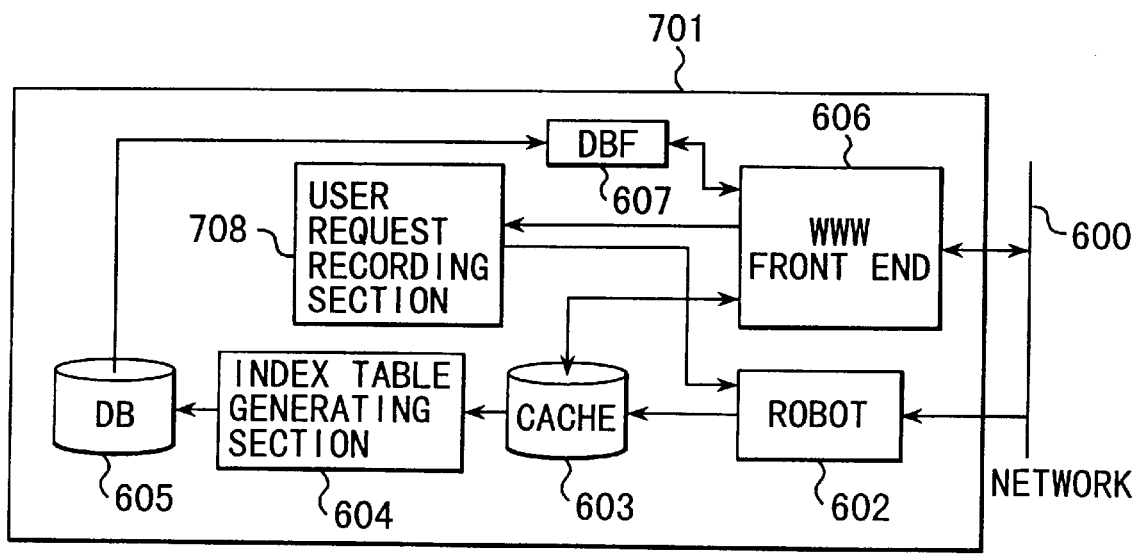
F I G. 12

RETRIEVAL SYSTEM FOR FREQUENTLY UPDATED DATA DISTRIBUTED ON NETWORK

BACKGROUND OF THE INVENTION

The present invention relates to a retrieval system for data distributed on a network.

Many retrieval systems on a network, using robots such as Altavista (http://www.altavista.com/), Lycos (http://www.lycos.com/), and excite (http://www.excite.com/) are present. In these systems, a robot is a software for mechanically collecting information on the network. The collected data are subjected to index table generation (web page data is subjected to morphological analysis, and an index table is prepared and stored in a database). Users can retrieve desired data in the database.

The robot searches for a sentence described by the HTML (HyperText Markup Language) and a plain text and traces link destinations described in the sentence to collet data present on the network. In index table generation, a robot searches, as a retrieval target, for a full text or a part such as a title or an URL.

The database may be a distributed database because it has a very large quantity of data. The distributed database is simply divided due to the very large quantity of data, but is not divided for a specific purpose.

The above retrieval is performed using a keyword. That is, a word supposed to be contained in a sentence to be searched is input to retrieve the target sentence.

A mirror site may be provided to reduce the concentration of access to a popular site and reduce the traffic. For example, in the I-Server (http://www.pointcast.com/products/iserver.html) available from Point Cast Network (PCN), data are periodically prefetched to the PCN main office to manage the mirror site.

In a conventional retrieval system for data distributed on a network, the following problems are posed.

(1) It tends to be difficult to handle an increasing quantity of data.

For example, the number of page data on the WWW (World Wide Web) is supposed to be approximately 40,000,000 or more. The number of page data is expected to exponentially increase in the future. At present, the number of pages and the data quantity per page tend to greatly increase.

When the greatly increasing data are simply divided based on their quantities, it is very difficult to manage the database.

(2) It is difficult to handle data having a high update frequency.

Data to be updated several times a day may possibly fall outside the range of robot retrieval targets in the current retrieval system due to the following reason. Even if the frequently updated data are collected by the robot and subjected to index table generation, the data may often be updated before they are retrieved. In this case, even if a page appearing in the retrieval result is checked, the page is already missing, or the contents of the page are entirely changed. As a result, data having the contents against the will of the user may be undesirably displayed.

BRIEF SUMMARY OF THE INVENTION

It is an object of the present invention to provide a retrieval system for efficiently obtaining a very large quantity of retrieval target data distributed on a network and forming them into a database.

It is another object of the present invention to provide a retrieval system for effectively producing an index table for even data having a very high update frequency.

According to the present invention, there is provided a retrieval system for preparing a database on the basis of data (e.g., hypermedia data such as a page) collected using a robot on a network (e.g., Internet WWW) and performing database retrieval in accordance with a retrieval request, comprising database preparation means for collecting corresponding data to prepare a database having a predetermined structure under at least conditions that an update frequency range (e.g., statistical update frequencies or final update times) of data serving a target for index table generation is uniquely assigned to the database, and an update frequency of the data falls within the assigned update frequency range, or a mean update frequency in a data group (e.g., a site) to which the data belongs falls within the assigned update frequency range.

The database has a structure constituted by, e.g., sets of data addresses and keywords. More specifically, a keyword is added to a page URL.

According to the present invention, if the magnitude of the data update frequency (or the degree of the latest of the final update time) is regarded as a degree of popularity, data can be managed by different databases depending on the degrees of popularity. A high-end computer is used to process a database having a high degree of popularity, i.e., a high access frequency, whereas a low-end computer having a low processing capacity is assigned for a very large quantity of data having a low access frequency. A system efficiently using hardware resources can be constructed. Therefore, there can be provided an effective retrieval system having a very large quantity of data as targets.

This retrieval system also has a proxy function. If data requested by a user is present in the system, the data can be presented to the user regardless of whether the data is obtained by a user request or collected by a robot.

Retrieval can be applied to data having a very high update frequency.

According to the present invention, all obtainable data are not collected using a robot, but the robot prefetches data designated in advance, and data supposed to be referred to and requested by a user from the statistical viewpoint. Effective mirroring can be performed for appropriate data.

According to the present invention, data having different contents at different times can be managed even if these data are originated from source data having one name.

The present invention incorporates both an apparatus and a method.

The present invention also incorporates a mechanically readable medium which records a program for allowing a computer to execute a corresponding procedure or means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view for explaining a method of sharing a database depending on final update times;

FIG. 2 is a diagram showing an arrangement of a retrieval unit according to the first embodiment of the present invention;

FIG. 4 is a flow chart showing the detailed operation of step S23 in FIG. 3;

FIG. 5 is a block diagram showing another arrangement of the retrieval unit according to the first embodiment;

FIG. 10 is a block diagram showing a system configuration when a plurality of networks are connected;

FIG. 11 is a block diagram showing an arrangement of a retrieval unit according to the second embodiment of the present invention;

FIG. 12 is a block diagram showing another arrangement of the retrieval unit according to the second embodiment of the present invention;

DETAILED DESCRIPTION OF THE INVENTION

Figure 3:
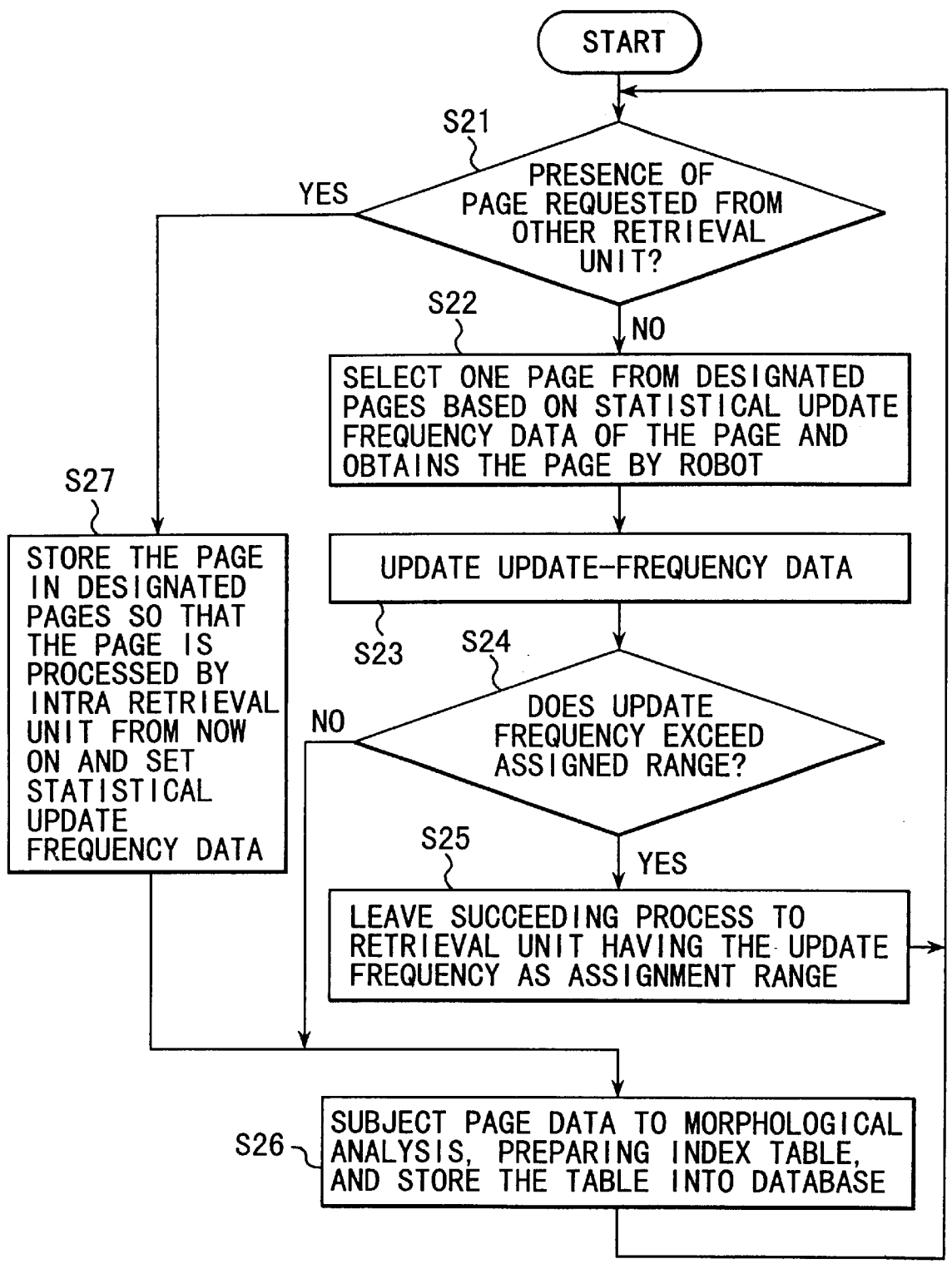
FIG. 3 is a flow chart showing a processing sequence of the retrieval unit.

Preferred embodiments of the present invention will be described below with reference to the accompanying drawings.

First of all, terms will be defined below.

A "proxy" is defined as a server which is arranged between a client (e.g., a user terminal) and a server (e.g., a WWW site) on the application level in resource access from the client to the server, and has a function of relaying a resource access request from the client to the server, and relaying a response from the server to the client.

A "page" is defined as a hypertext page. One page has a unique URL in the WWW world.

A "URL" (Uniform Resource Locator) is defined as information required for accessing page data. The URL contains a protocol, a domain name, a port number, and a path name.

A "CGI" (Common Gateway Interface) is defined as an interface for starting a program from the server in order to prepare an interactive or dynamic page.

A "robot" is defined to read a document described by a hypertext such as the HyperText Markup Language (HTML) or the Standard Generalized Markup Language (SGML) and mechanically trace links written in the document to collect data on the network. The robot is realized by software. The robot is also called a spider or wanderer.

The basic operations of the robot are as follows.

(Step 1): registers a designated home page in a visiting list.

(Step 2): obtains a page in accordance with the visiting list.

(Step 3): analyzes the obtained page to extract a URL.

(Step 4): adds the extracted URL to the visiting list (note that each URL will not be registered twice).

Steps 2 to 4 are then repeated. Note that the page obtaining frequency may be determined in accordance with a page update frequency.

This embodiment will be generally described.

In this embodiment, pages are exemplified as data distributed on a network.

As previous described, for example, the number of pages (kinds of pages) on the World Wide Web (WWW) is supposed to be 40,000,000 or more. This number is expected to exponentially increase in the future. It is therefore very difficult to manage a very large number of pages in a single database.

The simplest method of dividing the database is to divide the database in units of sites (domains). In this case, all the databases must be accessed at high speed, thereby increasing a load on database construction.

According to the first embodiment, the contents of a database are divided in accordance with degrees of popularity. A very popular database is accessed by a high-speed system (e.g., a machine having a large-capacity memory), whereas a less popular database is accessed by a low-speed system. With this arrangement, a high-speed machine can be used for only the very popular database, thereby effectively reducing the load on database construction.

To know the degree of popularity of a page, a rating survey or the like must be made for the network, strictly speaking. This work is very difficult and is not practical. According to this embodiment, the following approximation which can be easily satisfied is used. It is assumed that "to maintain popularity of a page without losing interest, the contents of the page must always be updated". It is then approximated such that a "page having a high data update frequency is a highly popular page". That is, according to this embodiment, the data update frequency is used as a barometer for popularity, and the contents of the database are divided in accordance with the data update frequency. Note that the page update frequency is information obtained by running a robot.

Some pages having a high update frequency are updated several times a day. When a method of sometimes accessing such a page is employed, actual page data may not coincide with the database in the retrieval system. In particular, when pages are referred to in accordance with the database retrieval result, a target page may be already missing. Even if the target page itself is present, the contents may be changed to other contents, thus resulting in inconvenience.

On the other hand, to reduce contradiction to a stereotyped database, the robot must access a page having a very high update frequency. To frequently access such a page so as to catch up with latest page information frequently updated at random, wasteful traffics increase, and both the information holding sites and the retrieval system have disadvantages.

According to the second embodiment, original data subjected to database preparation is preserved and presented to the user. With this arrangement, a delay from the actual page updating occurs, but the traffic need not increase uselessly.

The original pages (pages of the database version) corresponding to the retrieval result can always be referred to.

The first and second embodiments may be combined with each other. In this case, the effects of these embodiments can be obtained.

The preferred embodiments of the present invention will be described in detail below.

(First Embodiment)

The first embodiment will be described below.

Figure 7:
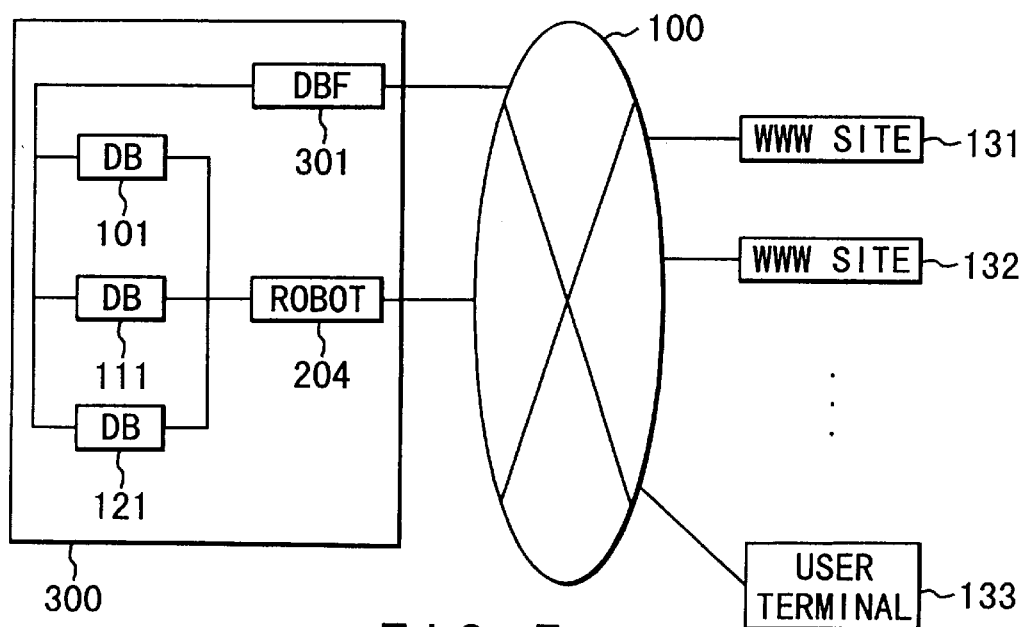
FIG. 7 is a block diagram showing still another arrangement of the retrieval unit of the first embodiment.

A system configuration of this embodiment is shown in FIGS. 2, 5, and 7.

In this embodiment, a plurality of databases are prepared and are selectively used in accordance with data update frequencies. More specifically, the range of page data update frequencies serving as targets is assigned to each database. In retrieval using a keyword requested by a user, the plurality of databases cooperate for retrieval, and all the results are presented to the user.

The following page data assignment methods for the respective databases are assumed:

(a) assignment using statistical update frequency information;

(b) assignment using final update times; and (c) assignment using total information of the statistical update frequency information and the final update time.

The assignment method (b) using the final update time will be described below.

It is assumed that a given page is frequently accessed immediately upon updating (i.e., very popular), and the access frequency decreases with the elapse of the time upon final updating (i.e., less popular). As shown in FIG. 1, databases to be stored are assigned depending on the final update time range.

The methods of determining a database for storing information of the given page are as follows.

(1) A database to be stored in units of sites is determined. In this case, the mean value of the data update frequencies in the site is used as an evaluation value.

(2) A database to be stored is determined in units of directories in a site. In this case, the mean value of the data update frequencies in a directory is used as an evaluation value.

(3) A database to be stored is determined in units of data. In this case, the data update frequency is used as an evaluation value.

The update frequency can be exemplified by the statistical update frequency data and the last update time.

Methods (1) to (3) can be used together. For example, a database may be determined in units of sites for site A, and a database may be determined in units of data for site B. A database may be determined in units of directories for directory a in site C, and a database may be determined in units of data for directory b in site C.

Data having a higher update frequency can be stored in a server connected to an intranetwork. For example, data having a higher update frequency is stored in an intranetwork in an organization, whereas data having a lower update frequency is managed at a location directly connected to the intranetwork.

In this embodiment, a keyword and an URL are stored in a database in place of a page itself. A keyword obtained by extracting a page by full text retrieval is added to an URL, and the resultant data is stored. In this case, the URL is retrieved using the keyword.

This embodiment exemplifies a database in units of words or keywords. However, a database may be prepared in units of characters.

The system configurations shown in FIGS. 2, 5, and 7 will be described below.

In the configuration of FIG. 2, retrieval units 100, 110, and 120 constituted by a plurality of sets of robots and databases (101 and 102, 111 and 112, and 121 and 122), a plurality of WWW sites (131 and 132), and a user terminal (133) are connected to a network 100.

A target update frequency is assigned to each database in accordance with the above page assignment methods.

The first robot 102 collects a site or data group whose frequency is changing to a high frequency (collects from, e.g., the WWW sites 131 and 132), prepares a database from the site or data group, and stores the database in the first database 101.

The third robot 122 collects a site or data group whose frequency is changing to a low frequency, prepares a database from the site or data group, and stores the database in the third database 121.

The second robot 112 collects a site or data group whose frequency is changing to the remaining intermediate frequency, prepares a database from the site or data group, and stores the database in the second database 111.

The ranges of the actual statistical update frequency data (or last update times) respectively corresponding to the high, low, and intermediate frequencies are appropriately set.

A dynamic change in database assignment will be described below.

In this embodiment, the URL of a page corresponding to each database divided in accordance with the update frequency data obtained from statistical data is stored. The page update frequency (or the mean update frequency of a site to which a page belongs) may change, and the update frequency of a given page (or the mean update frequency of a site to which the given page belongs) may fall outside the update frequency range of the initial database assigned to the given page. The data or site of the given page is preferably requested to be assigned to a database having an appropriate update frequency range in place of the database currently assigned to the given page. This request can be realized by a negotiation between the databases.

For example, as shown in FIG. 2, the first robot 102 collects a data group statistically having a high update frequency and stores it in the first database 101. When the update frequency of data having been initially updated at a high frequency becomes lower than the range assigned to the first database 101, the first database 101 transfers control to the second robot 112 and the database 111. When the update frequency is greatly lowered, the first database 101 transfers control to the third robot 122 and the database 121.

FIG. 3 shows a processing sequence for each retrieval unit when a plurality of robots and a plurality of databases are arranged in accordance with update frequencies, as shown in FIG. 2.

In step S21, each retrieval unit determines whether page assignment is requested from any other retrieval unit. If YES in step S21, the operation in step S27 is executed; otherwise, the operation in step S22 is executed.

In step S22, each robot selects one designated page and obtains this page. At this time, scheduling is performed to obtain a page in accordance with a frequency proportional to the statistic update frequency of the page. If no statistical update data is available for a target page, the mean value of the statistical update frequencies of the pages of a site which contains the target page, or a default value may be used.

In step S23, the statistical update data of the obtained page is updated in accordance with whether the obtained page has been changed from the previous one. Although not shown in the flow chart of FIG. 3, the target page cannot be obtained due to a trouble in the network or mating server, data representing that the target page cannot be obtained is stored, and the flow returns to step S22. The robot retrieves a page at the next visiting URL described in the visiting list.

Steps S22 and S23 will be described in detail below with reference to FIG. 4.

In step S51 of FIG. 4, when the robot obtains the given page, the robot stores an access count value. Note that the access count value at last_time(URL) is stored for the URL for the given page. In step S52, data indicating whether or not the obtained page has been changed from the previous one is stored. Assume that the last access is defined as 0th access. When the contents of a given URL are changed between the (i+1)th access from the latest access and the ith access, u(UARL,i) becomes 1; otherwise, it is set to 0. In step S53, the robot stores an access time required for obtaining the given page. When the page cannot be completely obtained within a time Tmax, the robot interrupts to obtain this page and defines the access time required for obtaining the page as Tmax. This access time data is not stored in units of pages, but in units of domains. When different pages are accessed in one domain, the access of the different pages is stored as one sequence. The access time in the ith access to a given domain DOM from the latest access is defined as t(DOM,i). Note that n preceding access time data are stored for each page, and older access time data are discarded.

In a visiting destination determination routine, the revisit page order must be determined for each domain. The following measure is used as an evaluation measure. Note that an URL is not listed in the visiting list if the following value is equal to or larger than a predetermined value.

$$K \sum_{i=0} a^{i \cdot u(URL,i) - \text{last\_time}(URL)}$$

$$K > 0, 1 \geq a > 0$$

The robot determines whether to visit domains one by one in the predetermined order.

(1) If the visiting list for a domain is empty, this domain is not visited.

(2) When one uniform random number of [0,1] is obtained and satisfies the following condition, the corresponding domain is visited.

$$\text{Value of Uniform Random Number} \geq \frac{\sum_{i=0}^{n-1} b^i t(DOM,i)}{\sum_{i=0}^{n-1} b^i T_{\max}} \quad 0 < b \leq 1$$

(3) The start URL is deleted from the visiting list, and the page having the deleted URL is visited.

In step S24, it is determined whether the new update frequency exceeds the assigned range. If YES in step S24, the robot leaves the succeeding process to a retrieval unit having the update frequency as the assigned range. At this time, the page data is erased.

Referring back to FIG. 3, if it is determined in step S24 that the new update frequency does not exceed the assigned range, the obtained page data is subjected to index table generation. For example, the page data is subjected to morphological analysis, decomposed into words, and subjected to index table generation in the form of pages having words. At this time, the previous data of this page is erased.

If the presence of a page requested from any other retrieval unit is determined in step S21, the page is registered, and its statistical frequency data are set so as to process this page by an intra robot in step S27.

In this embodiment, when a retrieval user is to retrieve data in a database, the user sends a retrieval request from the user terminal 133 to one or the plurality of databases 101 111, and 121. In the former case, that is, when the retrieval data is sent to one of the databases, two modes are available. The first mode is to send back the result from only a database having received the retrieval request, and the second mode is that the database having received the retrieval request makes inquiries to other databases and merges and sends back the results.

The configuration in FIG. 5 will be described below. The configuration in FIG. 5 is basically identical to that of FIG. 2. A plurality of databases 101, 111, and 121 are prepared in accordance with the data update frequencies. However, the configuration in FIG. 5 is different from that of FIG. 2 in that only one robot 204 is used.

Figure 6:
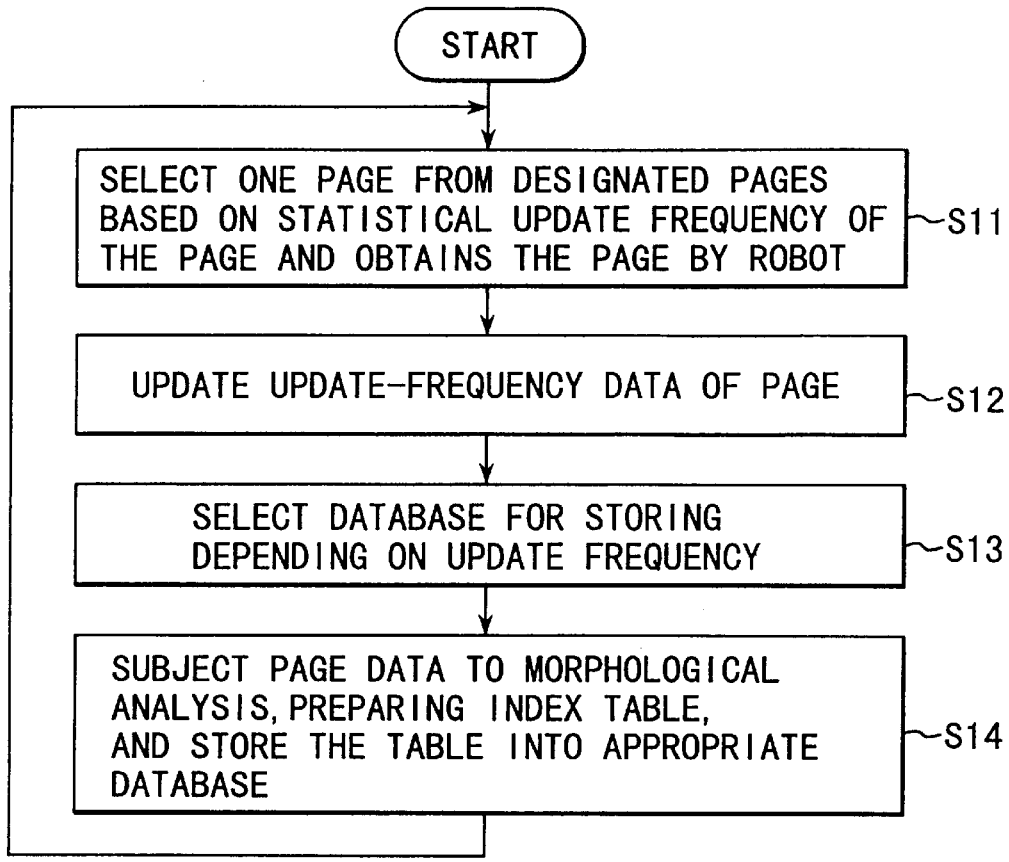
FIG. 6 is a flow chart showing a processing sequence of the retrieval unit.

FIG. 6 shows a processing sequence for a retrieval unit in a system wherein one robot and a plurality of databases are arranged as shown in FIG. 5.

In step S11, one designated page is selected and obtained by the robot 204. In this case, scheduling is performed to obtain the page based on the statistical update frequency of the page. Note that if no statistical update frequency data is available for this one designated page, the mean value of the statistical update frequencies obtained for the pages of a site containing this one designated page, or a default value may be used in place of the statistical update frequency data of this one designated page.

In step S12, the statistical update data of the page is updated in accordance with whether the obtained page has been changed from the previous one. This target page cannot be obtained due to a trouble in the network or mating server, data representing that the target page cannot be obtained is stored, and the flow returns to step S11.

In step S13, a database to be assigned to the target page is determined in accordance with the new statistical update frequency of the page obtained in step S11.

In step S14, the page data is subjected to index table generation. For example, the page data is subjected to morphological analysis, decomposed into words, and subjected to index table generation in the form of pages having words. The target data is stored in the database determined in step S13. At this time, the previous data of this page is erased. If the page data is stored in a database different from the database in which this page data has been stored, the page data in the original database is also erased. If the obtained page is not changed from the previous one, no index table is generated. However, when a database to which the obtained page is to be stored is changed, only a data "move" operation is performed.

As described above, the number of robots need not coincide with the number of databases.

For example, in FIG. 5, the number of robots may be two or four or more. The relationship between each robot and each database may be set, as needed.

Note that database retrieval by the retrieval user is identical to that described with reference to FIG. 2.

The configuration in FIG. 7 will be described below. A retrieval unit 300 in FIG. 7 is different from the retrieval unit 200 in FIG. 5 in that a database front end (DBF) 301 for controlling all databases is arranged.

In the configuration in FIG. 7, the DBF 301 accepts a retrieval request from a user terminal 133, makes an inquiry to an appropriate database, and presents the result to the user. In this example, a robot collects and retrieve data and transfers the retrieval result to the DBF.

The retrieval target range designation in database retrieval will be described below.

In the first embodiment, it is preferable to designate a target update frequency range and/or a target update time range in addition to a retrieval condition using a keyword. When an update frequency is not preliminarily designated in the retrieval request, the database or DBF may perform retrieval using a default value (e.g., the update frequency range for only the database having the highest update frequency).

Figure 8:
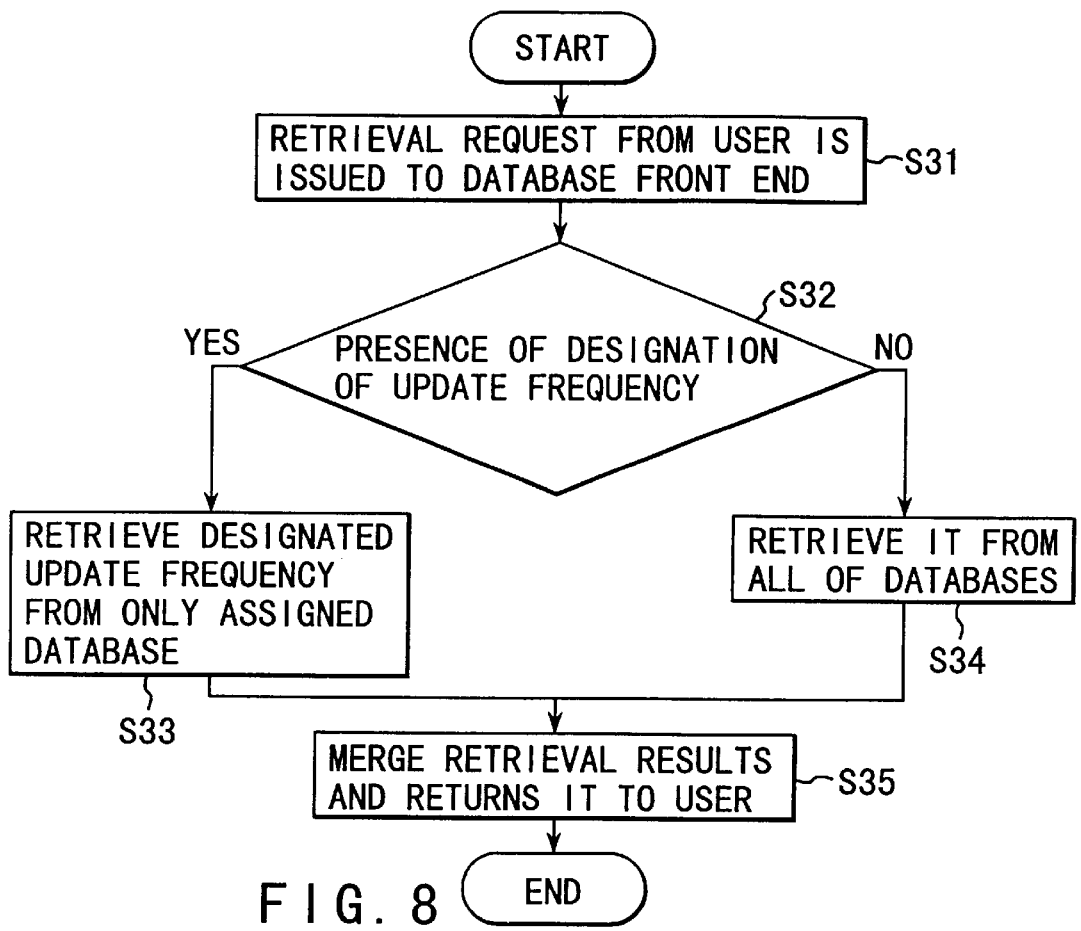
FIG. 8 is a flow chart showing a processing sequence of the retrieval unit of the first embodiment.

A retrieval sequence in the retrieval unit in FIG. 7 is shown in FIG. 8.

When the user sends a retrieval request from the user terminal 133 to the database front end 301, the database front end 301 receives the retrieval request from the user terminal 133 in step S31.

It is determined in step S32 whether designation of the update frequency is present.

If YES in step S32, retrieval is performed in only a database having an appropriate range corresponding to the target range of the retrieval request of the user in step S33.

If, however, NO in step S32, the designated update frequency is retrieved from all the databases.

The retrieval results are merged and returned to the user terminal 133 in step S35.

The system hardware configuration will be described below.

In the first embodiment, a system is preferably configured as follows. Computers constituting databases (or databases and robots) assigned to higher update frequencies (e.g., higher statistical update frequencies or newer final update times) preferably have a higher speed and is larger in number than computers constituting databases (or databases and robots) assigned to lower update frequencies (e.g., lower statistical update frequencies or older final update times). In this manner, the processing capacity of the computer assigned to the database for retrieving data having a higher update frequency is set equal to or higher than that of the computer assigned to the database for retrieving data having a lower update frequency.

More specifically, the database assigned to the data having a higher update frequency is more frequently used than the database assigned to the data having a lower update frequency. The total processing capacity can be increased by increasing only the processing capacity for the database assigned to the higher update frequency.

When the database is divided in accordance with the update frequencies as in this embodiment, only the computer for the database having a higher update frequency must have a high operation speed, thereby effectively reducing the load on database construction.

Figure 9:
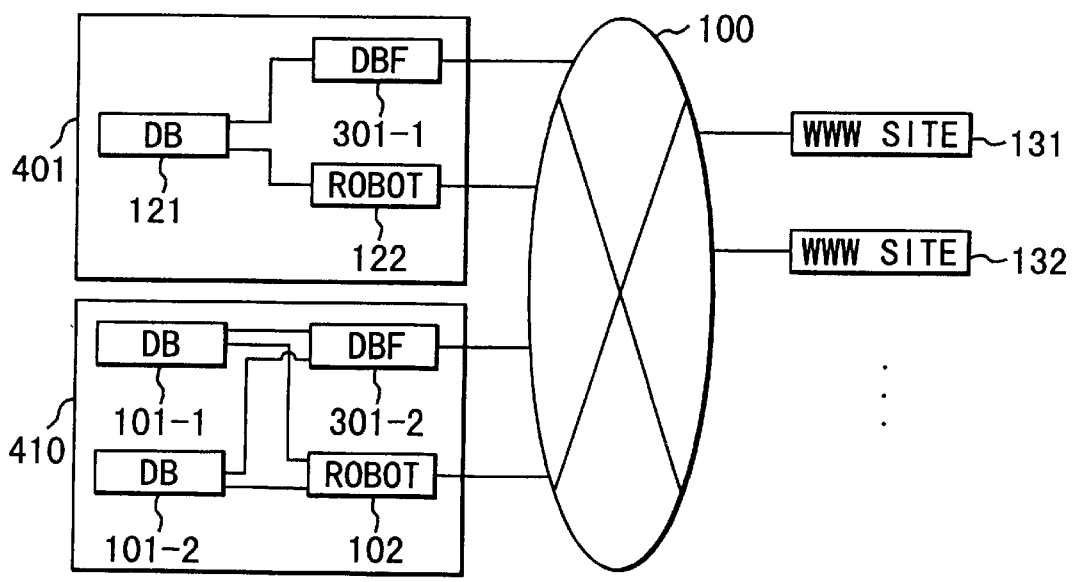
FIG. 9 is a block diagram showing still another arrangement of the retrieval unit of the first embodiment.

For example, as shown in FIG. 9, when a computer group constituting a first retrieval unit 410 is assigned to a data group having a high update frequency, and a computer group constituting a second retrieval unit 401 is assigned to a data group having a low update frequency, the database in the first retrieval unit 410 is doubled in terms of hardware, thereby achieving a high-speed operation. As a means for high-speed operation, hardware is configured in a multiple arrangement. In addition, a computer using a high-speed element may be used, or a memory capacity may be increased.

The above embodiment exemplifies one network. However, as shown in FIG. 10, the present invention is applicable to an environment in which a plurality of networks 500 to 504. In addition, the networks 500 to 504 may link physically remote locations such as organizations or countries.

(Second Embodiment)

The second embodiment will be described below.

When a retrieval system has a proxy function and page data to be referred to as a retrieval result, this page data is not retrieved through a network, but is simply returned. This can cope with the above-mentioned problem of the page frequently changed. When links represented as the retrieval result are traced for the page frequently changed, this page may be already missing or uselessly updated. To the contrary, data used in a retrieval database is presented, this problem is not posed.

Figure 14:
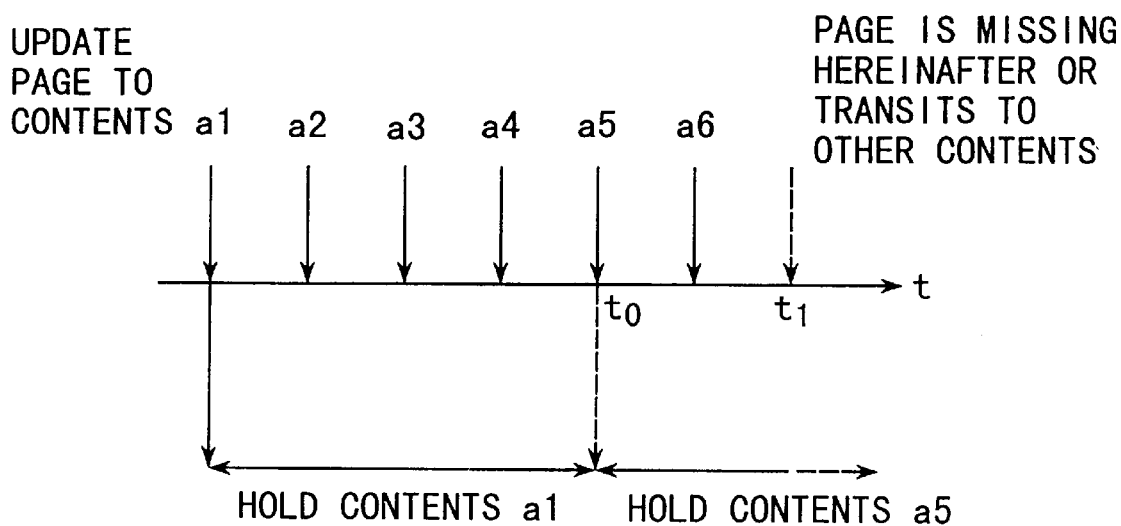
FIG. 14 is a view for explaining sampling of a frequently changing page.

The page frequently changed is sampled and obtained, and its contents are held until the next access, as shown in FIG. 14. Even if the page is missing or its contents are entirely updated at t1 in FIG. 14, the contents sampled last at t0 can be presented.

FIG. 11 shows the system configuration of this embodiment.

As shown in FIG. 11, a retrieval unit 601 of this embodiment is connected to a network 600 and comprises a robot 602, a cache 603, an index table generating section 604, a database (DB) 605, a database front end (DBF) 607, and a WWW front end 606. Although not shown in FIG. 11, WWW sites and user terminals are connected through the network 600.

The database in FIG. 11 is constituted by one database, but may be divided into a plurality of databases. The first embodiment may be applied to the plurality of databases, and data assignment to the databases may be determined in accordance with the data update frequencies.

In this embodiment, the URLs of the pages are stored in the database. A keyword extracted upon full text retrieval of a page may be added to the URL, and the URL is retrieved using the keyword.

Index table generation will be described first, and then a method of using the database will be described.

A sequence up to index table generation is shown below.

The robot 602 is used to collect data from other WWW sites through the network 600 in accordance with the visiting list. If the intra WWW site has unique contents, data is also collected from the intra WWW site.

The collected data are stored in the cache 603.

The retrieval database 605 is prepared by the index table generating section 604 using the data stored in the cache 603. For example, in keyword retrieval in units of words, the index table generating section 604 morphologically analyzes the data in the cache 603 and generate an index table in units of words. When a user requests data containing a specific word, database retrieval can be immediately performed. In this retrieval unit, the addresses (URLs) on the network from which the data are obtained are not used, but the addresses of the data stored in the cache 603 are used as data locations in index table generation.

A page obtained upon access by the WWW front end 606 in response to a reference request from the user is stored in the cache and is subjected to index table generation as in the above case.

A sequence for using the database is shown below.

The user accesses the WWW front end 606 of the retrieval unit 601 through the network 600 and outputs a retrieval request.

This request is transmitted to the database front end (DBF) 607. If a plurality of databases are available, an appropriate database is selected, and the retrieval request is output thereto.

When the retrieval request is output to the plurality of databases, the database front end (DBF) 607 controls the retrieval results from these databases and present the retrieval results to the user through the WWW front end 606.

When the user wants to refer to the contents of one of the retrieval results, the user outputs a reference request to the WWW front end 606 of the retrieval unit 601.

If the page requested for reference is stored in the intra cache 603, the WWW front end 606 extracts this page from the cache 603 and returns it to the reference user. If the page is not stored in the intra cache 603, a message representing the requested page is not present in the cache is returned to the user.

In the retrieval unit, all obtainable data need not be collected using a robot, but only data supposed to correspond to reference requests from the statistical viewpoint may be prefetched using the robot. This method is effective when all data on the WWW are not always retrieval targets or when data is updated based not on the actual page update frequency but on a user request.

More specifically, when all the data on the WWW are not always retrieval targets, the range of data collected by a robot becomes important. The pages and sites appearing in response to requests to the retrieval server/proxy are statistically processed, and data having a high frequency and the data of a site having a high frequency are preferentially prefetched in advance using a robot. At this time, a page having an actual page update frequency is frequently visited by the robot, and a page having a high reference request occurrence frequency is frequently visited by the robot. Therefore, mirror processing can be performed for appropriate data without any special designation by a system manager.

The configuration of the above retrieval unit is shown in FIG. 12.

A retrieval unit 701 in FIG. 12 is obtained by adding a user request recording section 708 to the retrieval unit 601 in FIG. 11. A description of the corresponding parts will be omitted, and only different parts will be mainly described.

Figure 13:
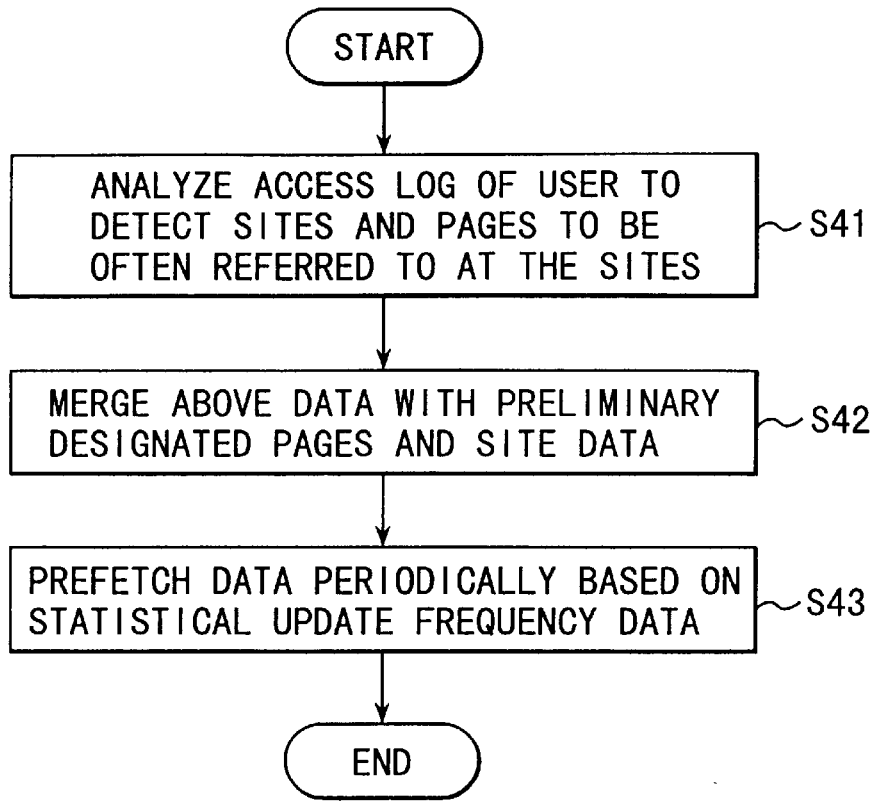
FIG. 13 is a flow chart showing a processing sequence of the retrieval unit of the second embodiment.

FIG. 13 shows the processing sequence of data collection in the retrieval unit 701.

In step S41, the access log of the user recorded in the user request recording section 708 is analyzed to detect sites and pages to be often referred to at the sites.

In step S42, the page and site data preliminarily designated by the system manager are merged with the data obtained in step S41.

In step S43, the resultant data is obtained using the robot in accordance with the statistical update frequency. If no statistical update frequency is obtained for a given page, the mean value of the statistical update frequencies of the pages of a site containing the given page is used in place of the statistical update frequency of the given page. In addition, when the statistical update frequency of this site is unknown, the known statistical update frequencies of the remaining sites or a default value is used. Data is repeatedly obtained at a frequency proportional to the known statistical update frequency data. If a high possibility of updating a given site at given time is known, data is retrieved immediately after updating at the given time.

The retrieval unit 701 also serves as a proxy. When the user simply wants data on the network, the user outputs not a retrieval request but a reference request to the retrieval unit 701. This reference request is output to the user request recording section 708 through the WWW front end 606. The request data is recorded in the user request recording section 708. When the requested data is present in the cache 603, it is returned as it is. If no data is present, data is retrieved through the network 600. The retrieved data is temporarily stored in the cache 603 and returned to the user through the WWW front end 607.

As described above, in the retrieval unit shown in FIG. 12, data representing the user interest for data is stored in the user request recording section 708. In collecting data with the robot in advance, all the data obtainable by the robot are not obtained. Only the data stored in the user request recording section 708 and data preliminarily designated to be obtained are obtained.

A data group not to be obtained may be designated and will not be obtained even if this data group is stored in the user request recording section 708.

Data frequently updated is assumed not to be effective even if the records in the user request recording section 708 are referred to. This is because the revisit to the site containing this data often results in missing of this data. For such data, only the path to the site or data is defined as effective data, and the robot obtains data from the site containing the data frequently updated even if the obtained data is not the original data.

For example, a URL having the following number as its name is often temporarily present.

http://www.tsb.co.jp/foo/1246389.html

In this case, this file is not obtained again, but a given file linked with the above file is obtained, and a destination file is obtained by tracing the links of the given file.

The retrieval unit in FIG. 12 assumes that prefetched data is used in the future. In this case, the prefetch targets are arbitrary media such as character data, an image, speech, and a motion picture. Assume that only character data is prefetched due to the limitation of the storage capacity. In this case, if a motion picture is contained in a page of the character data, the motion picture is retrieved through the network or is not displayed when the user refers to this page.

The page obtaining frequency in the retrieval unit in FIG. 11 or 12 will be described below.

The robot periodically obtains pages having the same URL. In this case, the robot preferably obtains the pages at frequencies corresponding to the update frequencies of the target pages again. More specifically, the robot obtains a target page the number of times proportional to the number of times the target page is statistically updated a day. When the designated data is missing, this data is not retrieved again. When the obtained data has a hyperlink, data of the link destination can also be retrieved.

Even if the user outputs a read request, no response is made for the data of the designated site and URL groups. This guarantees an operation in which a request is not made from the retrieval server to the same URL twice or more.

The retrieval targets in the retrieval unit in FIG. 11 or 12 will be described below.

In this embodiment, data obtained by a robot is stored in the proxy cache and can be managed at the same location for the data directly requested by the user.

The referred contents may be pay data which is not encrypted, or may pose the problem on privacy of the user. The data serving as the retrieval targets of the retrieval system may have limitations to access.

A method of limiting the access is a combination of at least one of the following conditions.

(1) Data are limited to the ones collected by robots.

(2) Data are limited to the ones held as the proxy.

(3) Data having the same name or address are limited to the latest ones.

(4) Data dynamically or interactively generated by a CGI are excluded.

(5) The sites and URLs are limited to the designated site and URL groups.

For example, in FIG. 11, when data is stored in the cache 603, a data obtaining situation is also recorded. That is, data is recorded together with data representing that this data is collected by a robot, that this data is directly requested by a user, that this data is dynamically or interactively generated by a CGI (this can be determined whether a character string CGI or BIN (binary) is contained in the path name of the URL), and that this data is contained in the designated site or URL group. The manager is allowed to designate the specific types of data which can be retrieved from the cache. The retrieval system performs index table generation for the data satisfying the conditions in accordance with this designation.

A change in addressing of the collected data in the retrieval unit in FIG. 11 or 12 will be described below.

In this embodiment, when collected data is to be stored in the cache of the retrieval unit, the address or URL of the collected data may be changed and stored. That is, since the data position is moved from a given position on the network to the cache in the retrieval unit, the domain name is changed to the domain name of the retrieval unit.

The original domain name is added to the head of the path name as follows.

Original URL:

http://www.foo.co.jp/bar/index.html

Domain Name of Retrieval Unit:

www.search.co.jp

New URL:

http://www.search.co.jp/www.foo.co.jp/bar/index.html

With this arrangement, the data can be mirrored.

The time management of the collected data in the retrieval unit in FIG. 11 or 12 will be described below.

In this embodiment, update time data may be added to the collected data to manage the collected data. As in the normal proxy, both the latest data and the past data are managed for the same address (URL). The time here means time at which the data becomes valid or time at which the data becomes invalid.

When the contents at the same URL are updated, the time at which the data becomes valid becomes invalid because the update time notified from the serve changes. When the data itself is missing, the time at which the data becomes valid is time at which the data is missing upon access.

The address (URL name) is so managed as to be changed for time management.

Since the data position is moved from a given position on the network to the cache in the retrieval unit, the domain name is changed to the domain name of the retrieval unit. The original domain name is added to the head of the path name as follows.

Original URL:

http://www.foo.co.jp/bar/index.html

Domain Name of Retrieval Unit:

www.search.co.jp

New URL:

http://www.search.co.jp/www.foo.co.jp/bar/index.html

In addition, time data is also added. For example, data is valid from 16:39 on Mar. 23, 1996 to 10:23 on Apr. 30, 1996 is as follows.

http://www.search.co.jp/www.foo.co.jp/bar/index.html/199603231639-199604301023

The following modification may also be considered.

http://www.search.co.jp/www.foo.co.jp/bar/index.html/1996.3.23.16.39-1996.4.30.10.23

Each configuration in each embodiment of the present invention described above can be realized by preparing a program for causing a computer to execute corresponding sequences or means and causing the computer to execute this program.

The program can be recorded on a mechanically readable medium, and the computer reads this program from the medium and executes the program.

The present invention is not limited to the embodiments described above. Various changes and modifications may be made within the technical scope of the present invention.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A retrieval system for performing database retrieval in response to a retrieval request, comprising:

means for obtaining data serving as a target for index table generation;

means for obtaining an update frequency range of the obtained data; and means for assigning, in accordance with the obtained update frequency range, the obtained data to a database serving as a target among a plurality of databases.

2. A system according to claim 1, further comprising means for, when the update frequency range of the obtained data corresponding to data assigned to the first database should be assigned to a second database, performing processing for using the second data base as the target.

3. The system according to claim 2, wherein a hardware constituting the retrieval system is constituted hierarchically depending on processing capabilities, and data having a high update frequency is assigned to the hardware of hierarchy of a high processing capability.

4. A system according to claim 3, wherein the high processing capacity is realized by at least one of using a higher-speed computer, using a large number of computers, and by lessening a task amount to be processed.

5. The system according to claim 1, further comprising retrieval means for cooperatively retrieving data in databases exclusively arranged depending on the update frequency range in response to a request from a user.

6. The system according to claim 5, wherein when a predetermined retrieval range is designated, the retrieval means retrieves data with respect to the predetermined retrieval range.

7. The system according to claim 5, wherein a hardware constituting the retrieval system is constituted hierarchically depending on processing capabilities, and data having a high update frequency is assigned to the hardware of hierarchy of a high processing capability.

8. A system according to claim 7, wherein the high processing capacity is realized by at least one of using a higher-speed computer, using a large number of computers, and by lessening a task amount to be processed.

9. The system according to claim 1, wherein a hardware constituting the retrieval system is constituted hierarchically depending on processing capabilities, and data having a high update frequency is assigned to the hardware of hierarchy of a high processing capability.

10. A system according to claim 9, wherein the high processing capacity is realized by at least one of using a higher-speed computer, using a large number of computers, and by lessening a task amount to be processed.

11. A retrieval system for performing database retrieval in response to a retrieval request, comprising:

means for obtaining data serving a target from index table generation;

means for obtaining an update frequency of data based on final update times obtained from the obtained data; and means for, when the final update time is within a predetermined period of time from the current time, accessing the obtained data to a highest hierarchical database among databases hierarchically assigned depending on the update frequency range, and for, when the final update time has elapsed the predetermined period of time from the current time, assigning the obtained data to the database serving as the target depending on the update frequency range.

12. The system according to claim 11, wherein a hardware constituting the retrieval system is constituted hierarchically depending on processing capabilities, and data having a high update frequency is assigned to the hardware of hierarchy of a high processing capability.

13. A system according to claim 12, wherein the high processing capacity is realized by at least one of using a higher-speed computer, using a large number of computers, and by lessening a task amount to be processed.

14. A retrieval system for preparing a database on the basis of data collected through a network and retrieving data in the database, comprising:

cache means for holding data obtained in response to an external reference request and the collected data; and data providing means for, when the external reference request is given and data corresponding to the external reference request is present in said cache means, providing the data from said cache means, and when the corresponding data is not held in said cache means, obtaining and providing the data from a server which originally holds the data.

15. A system according to claim 14, further comprising:

prediction means for predicting prospective data to be requested by an external reference request by performing statistical processing for data requested by external reference requests; and prefetch means for obtaining the predicted data and preliminarily designated data and prefetching the predicted data and the preliminarily designated data in said cache means.

16. A system according to claim 14, wherein said prefetch means repeatedly obtains the data at a frequency corresponding to an update frequency of data serving as an obtaining target.

17. A system according to claim 14, wherein a range limiting condition of data serving as a target in retrieval in response to the retrieval request is at least one of a condition of limiting data to collected data, a condition of limiting data to data obtained in response to an external reference request, a condition of limiting data to latest data having the same name or address, a condition of limiting data to data except data dynamically or interactively generated, and a condition of limiting data to a designated site or data group.

18. A system according to claim 14, wherein said cache means adds at least one of update time data and collection time data to the obtained data, and holding resultant data.

19. A method of preparing a database in a retrieval system for preparing a database on the basis of data collected through a network and performing database retrieval in response to a retrieval request, comprising the computer steps of:

uniquely assigning an update frequency range of data serving as a target object for index table generation to a database; and collecting corresponding data to prepare a database under at least a condition that an update frequency of data falls within the assigned update frequency range, or a mean update frequency of a data group to which the data belongs falls within the assigned update frequency range.

20. An article of manufacture comprising:

a computer usable medium having computer readable program code means embodied therein for causing a computer to prepare a data base based on data collected through a network and to conduct a database retrieval in response to a retrieval request, the computer readable program code means in said article of manufacture, comprising:

computer readable program code means for causing a computer to assign a range of data update frequency of target data to be built in the database; and computer readable program code means for causing a computer to collect data to prepare the database at least on the premise that the data update frequency of data group to which the target data belongs falls within the assigned range of the update frequency.

21. A retrieval system for performing database retrieval in response to a retrieval request comprising:

a robot for obtaining data serving as a target and an update frequency range associated with said data;

a database for storing the obtained data in an index table; and, a controller for controlling said database to store the obtained data in response to the update frequency range.

* * * * *

UNITED STATES PATENT AND TRADEMARK OFFICE
CERTIFICATE OF CORRECTION

PATENT NO.: 5,933,832

DATED: August 3, 1999

INVENTOR(S): Takashi SUZUOKA, et al.

It is certified that an error appears in the above-identified patent and that said Letters Patent is hereby corrected as shown below:

On the title page, item [30] "Foreign Application Priority Data" is missing.

Insert --SEPT. 17, 1996  [JP]   JAPAN..................................8 245049--.

Signed and Sealed this

Ninth Day of May, 2000

Attest:

Attesting Officer

Q. TODD DICKINSON

Director of Patents and Trademarks